US011128375B2

(12) United States Patent
Tam et al.

(10) Patent No.: US 11,128,375 B2
(45) Date of Patent: Sep. 21, 2021

(54) DISPERSION COMPENSATION IN MM-WAVE COMMUNICATION OVER PLASTIC WAVEGUIDE USING COMPOSITE RIGHT/LEFT-HANDED METAMATERIAL ASSEMBLY

(71) Applicant: Marvell World Trade Ltd., St. Michael (BB)

(72) Inventors: Sai-Wang Tam, Sunnyvale, CA (US); Alden C. Wong, Sunnyvale, CA (US); Su Chenxin, Seattle, WA (US); Rulin Huang, Los Angeles, CA (US); Randy Tsang, San Carlos, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 74 days.

(21) Appl. No.: 16/594,025

(22) Filed: Oct. 6, 2019

(65) Prior Publication Data
US 2020/0136726 A1    Apr. 30, 2020

Related U.S. Application Data

(60) Provisional application No. 62/750,699, filed on Oct. 25, 2018.

(51) Int. Cl.
*H04B 10/12*  (2006.01)
*H04B 10/2513*  (2013.01)

(52) U.S. Cl.
CPC ............... *H04B 10/25133* (2013.01)

(58) Field of Classification Search
CPC .......... H04B 10/25133; H04B 10/90; H04B 10/6161; H04B 10/2513; H04B 1/3838;
(Continued)

(56) References Cited

U.S. PATENT DOCUMENTS 8,451,175 B2 * 5/2013 Gummalla ............ H01Q 13/08
343/700 MS
2011/0050364 A1 * 3/2011 Achour ................ H03H 7/00
333/185
(Continued)

FOREIGN PATENT DOCUMENTS

WO    2018118338 A1    6/2018
WO    2018125228 A1    7/2018

OTHER PUBLICATIONS

Gupta et al. (Analog Signal Processing in Transmission Line Metamaterial Structures. © Jun. 2009 (Year: 2009).*
(Continued)

*Primary Examiner* — Hibret A Woldekidan

(57) ABSTRACT

A millimeter-wave communication device includes a coupler, Radio-Frequency (RF) circuitry and a composite right/left-handed metamaterial assembly. The coupler is configured to connect to a waveguide, the waveguide being transmissive at millimeter-wave frequencies and having a given dispersion characteristic over a predefined band of the millimeter-wave frequencies. The RF circuitry is configured to transmit a millimeter-wave signal into the waveguide via the coupler, or to receive a millimeter-wave signal from the waveguide via the coupler, and to process the millimeter-wave signal. The composite right/left-handed metamaterial assembly is formed to apply to the millimeter-wave signal, or to an Intermediate-Frequency (IF) signal corresponding to the millimeter-wave signal, a dispersion compensation that compensates for at least part of the dispersion characteristic of the waveguide over the predefined band.

20 Claims, 7 Drawing Sheets

(58) Field of Classification Search
CPC ............ H04B 3/52; H04L 2025/03356; H04L 25/022; H04L 25/03019; H04L 25/03159; H04L 27/2626; H04L 27/2647
USPC .......... 398/147, 159, 81, 148, 158, 141, 142
See application file for complete search history.

(56) References Cited

U.S. PATENT DOCUMENTS

| | | | |
|---|---|---|---|
| 2012/0081251 A1* | 4/2012 | Frigon | H01Q 15/0066 342/372 |
| 2018/0183522 A1* | 6/2018 | Dogiamis | H04L 25/03834 |
| 2019/0253094 A1 | 8/2019 | Tam et al. | |
| 2019/0312325 A1 | 10/2019 | Ahirwar et al. | |

OTHER PUBLICATIONS

International Application # PCT/IB2019/058504 search report dated Feb. 7, 2020.
Caloz., "Metamaterial Dispersion Engineering Concepts and Applications", Proceedings of the IEEE, vol. 99, Issue 10, pp. 1711-1719, Oct. 2011.
Gupta et al., "Analog Signal Processing in Transmission Line Metamaterial Structures", Radioengineering, vol. 18, No. 2, pp. 155-167, Jun. 1, 2009.
Lai et al., "Composite Right/Left-Handed Transmission Line Metamaterials", IEEE Microwave Magazine, pp. 34-50, Sep. 2004.
Tam et al., U.S. Appl. No. 16/527,109, filed Jul. 31, 2019.

\* cited by examiner

DISPERSION COMPENSATION IN MM-WAVE COMMUNICATION OVER PLASTIC WAVEGUIDE USING COMPOSITE RIGHT/LEFT-HANDED METAMATERIAL ASSEMBLY

CROSS-REFERENCE TO RELATED APPLICATIONS

This application claims the benefit of U.S. Provisional Patent Application 62/750,699, filed Oct. 25, 2018, whose disclosure is incorporated herein by reference.

FIELD OF THE DISCLOSURE

The present disclosure relates generally to millimeter-wave communication over plastic waveguides, e.g., in motor vehicles, and particularly to dispersion compensation for millimeter-wave plastic waveguides.

BACKGROUND

Metamaterials are artificial structures that can be designed to exhibit specific electromagnetic properties not commonly found in nature. Right-Handed (RH) metamaterials are structures in which the primary propagation mode is a forward wave. Left-Handed (LH) metamaterials are metamaterials with simultaneously negative permittivity and permeability, in which the primary propagation mode is a backward wave. Metamaterials that exhibit both RH and LH behavior are referred to as Composite Right/Left-Handed (CRLH) metamaterials. CRLH structures are described and analyzed, for example, in "Composite Right/Left-Handed Transmission Line Metamaterials," IEEE Microwave Magazine, September, 2004.

The description above is presented as a general overview of related art in this field and should not be construed as an admission that any of the information it contains constitutes prior art against the present patent application.

SUMMARY

An embodiment that is described herein provides a millimeter-wave communication device including a coupler, Radio-Frequency (RF) circuitry and a composite right/left-handed metamaterial assembly. The coupler is configured to connect to a waveguide, the waveguide being transmissive at millimeter-wave frequencies and having a given dispersion characteristic over a predefined band of the millimeter-wave frequencies. The RF circuitry is configured to transmit a millimeter-wave signal into the waveguide via the coupler, or to receive a millimeter-wave signal from the waveguide via the coupler, and to process the millimeter-wave signal. The composite right/left-handed metamaterial assembly is formed to apply to the millimeter-wave signal, or to an Intermediate-Frequency (IF) signal corresponding to the millimeter-wave signal, a dispersion compensation that compensates for at least part of the dispersion characteristic of the waveguide over the predefined band.

Typically, the composite right/left-handed metamaterial assembly includes a cascade of multiple transmission-line unit cells, each unit cell including (i) a series capacitance and a series inductance, and (ii) a shunt capacitance in parallel to a shunt inductance. In some embodiments, the dispersion characteristic of the waveguide exhibits a group-delay that increases with frequency over the predefined band of the millimeter-wave signal, and the composite right/left-handed metamaterial assembly exhibits a group-delay that decreases with frequency over the predefined band.

In an embodiment, the RF circuitry is configured to transmit the millimeter-wave signal into the waveguide, and the composite right/left-handed metamaterial assembly is configured to compensate for the at least part of the dispersion characteristic by pre-distorting the millimeter-wave signal prior to transmission into the waveguide. In another embodiment, the RF circuitry is configured to receive the millimeter-wave signal from the waveguide, and the composite right/left-handed metamaterial assembly is configured to compensate for the at least part of the dispersion characteristic by applying the dispersion compensation to the millimeter-wave signal received from the waveguide.

In a disclosed embodiment, the RF circuitry and the composite right/left-handed metamaterial assembly are integrated in a same semiconductor chip. In an embodiment, the communication device further includes digital baseband circuitry, and the digital baseband circuitry and the composite right/left-handed metamaterial assembly are integrated in a same semiconductor chip. In another embodiment, the digital baseband circuitry, the RF circuitry and the composite right/left-handed metamaterial assembly are packaged in a same device package. In an example embodiment, the digital baseband circuitry, the RF circuitry and the composite right/left-handed metamaterial assembly are mounted on a same substrate in the same device package.

In some embodiments, the composite right/left-handed metamaterial assembly is externally configurable to select a setting of the dispersion compensation from among multiple predefined settings of the dispersion compensation. In an example embodiment, the communication device further includes digital baseband circuitry configured to identify, from among the multiple predefined settings, a setting that best compensates for the dispersion characteristic of the waveguide, and to set the composite right/left-handed metamaterial assembly to the identified setting.

There is additionally provided, in accordance with an embodiment that is described herein, a method for millimeter-wave communication, including transmitting a millimeter-wave signal into, or receiving a millimeter-wave signal from, a waveguide, the waveguide being transmissive at millimeter-wave frequencies and having a given dispersion characteristic over a predefined band of the millimeter-wave frequencies. A dispersion compensation, which compensates for at least part of the given dispersion characteristic of the waveguide over the predefined band, is applied using a composite right/left-handed metamaterial assembly to the millimeter-wave signal, or to an Intermediate-Frequency (IF) signal corresponding to the millimeter-wave signal.

There is also provided, in accordance with an embodiment that is described herein, a millimeter-wave communication system including a first communication device and a second communication device. The first communication device is configured to transmit a millimeter-wave signal into a waveguide, the waveguide being transmissive at millimeter-wave frequencies and having a given dispersion characteristic over a predefined band of the millimeter-wave frequencies. The second communication device is configured to receive the millimeter-wave signal from the waveguide and to process the received millimeter-wave signal. At least one of the first communication device and the second communication device includes a composite right/left-handed metamaterial assembly, which is formed to apply to the millimeter-wave signal, or to an Intermediate-Frequency (IF) signal corresponding to the millimeter-wave signal, a dispersion compensation that compensates for at least part of the dispersion characteristic of the waveguide over the predefined band.

The present disclosure will be more fully understood from the following detailed description of the embodiments thereof, taken together with the drawings in which:

DETAILED DESCRIPTION OF EMBODIMENTS

Figure 1:
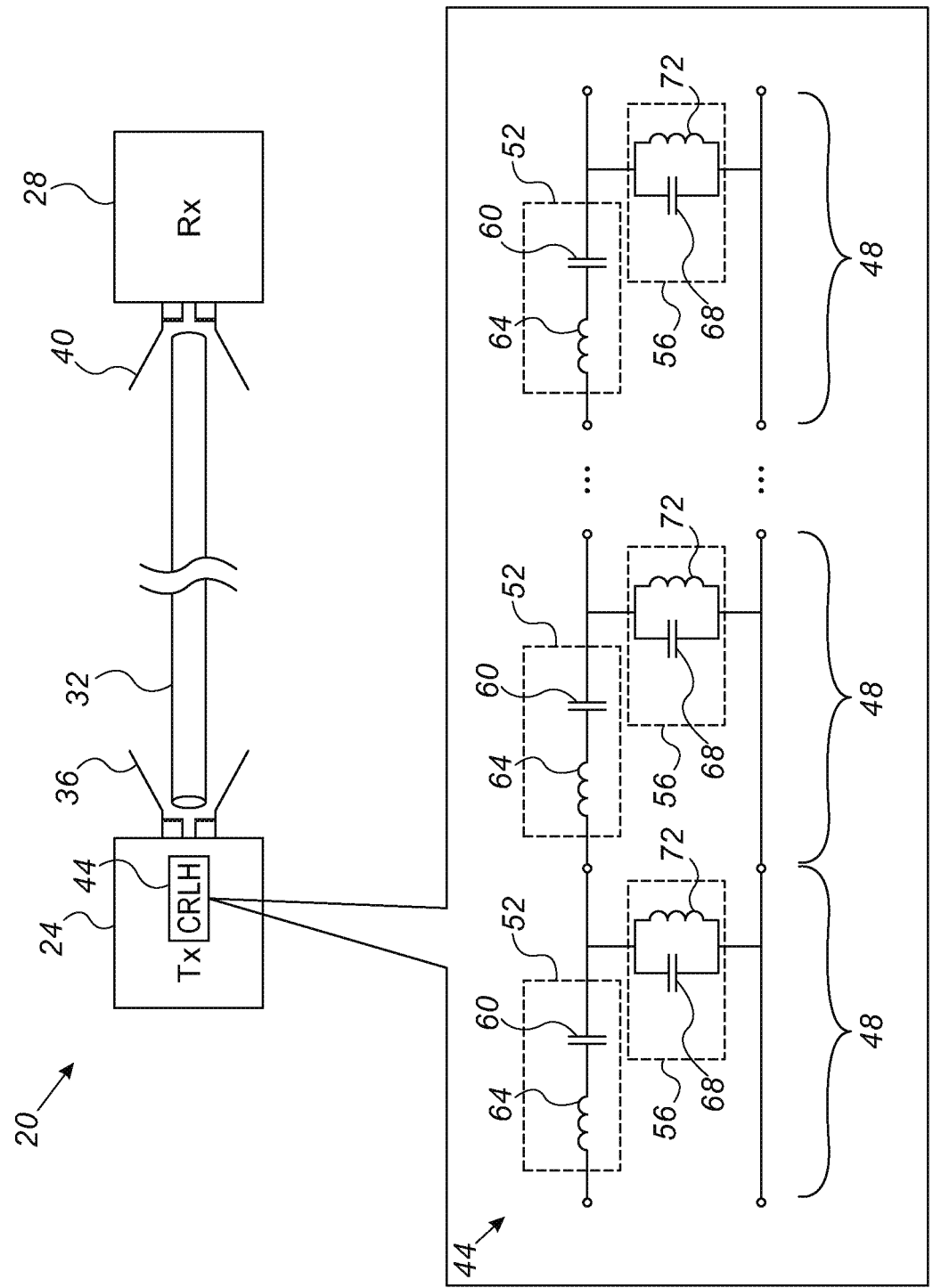
FIG. 1 is a block diagram that schematically illustrates a system for millimeter-wave communication over a plastic waveguide, including dispersion compensation using a Composite Right/Left-handed (CRLH) metamaterial assembly, in accordance with an embodiment that is described herein.

Automotive, industrial and smart-home environments are typically characterized by severe noise, demanding Electro-Magnetic Compatibility (EMC) requirements and limited space, and at the same time require communication at high data rates, high reliability and low cost. One attractive solution in such environments is millimeter-wave (mm-wave) communications over waveguides, e.g., waveguides made of suitable plastic materials.

The use of mm-wave waveguides is addressed, for example, in U.S. patent application Ser. No. 16/258,731, filed Jan. 28, 2019, entitled "MM-Wave Waveguide Physical Layer Interconnect for Automotive and Industrial Networks," in U.S. patent application Ser. No. 16/370,999, entitled "Plastic MM-Wave Waveguide with Integral Electrically-Conductive Transmission Line," filed Mar. 31, 2019, and in U.S. patent application Ser. No. 16/527,109, entitled "Dispersion Compensation in mm-Wave Communication over Plastic Waveguide using OFDM," filed Jul. 31, 2019, which are all assigned to the assignee of the present patent application and whose disclosures are incorporated herein by reference.

Although highly attractive in terms of cost, manufacturability and ease of installation, the dispersion characteristics of mm-wave waveguides pose a difficult challenge for transmission of broadband signals. In many practical cases, the dispersion of a plastic waveguide vary significantly as a function of frequency at mm-wave frequencies. Proper compensation for dispersion is critical for reliable communication at high data rates, e.g., 1 Gbps and above.

Consider, for example, a 15-meter long solid Teflon® waveguide of 1 mm radius. At a center frequency of 90 GHz, this waveguide typically exhibits a delay-spread of ~0.7 nSec and a coherent bandwidth of ~1.5 GHz. Unless accounted for, this sort of delay-spread and coherent bandwidth render the waveguide useless for broadband transmission.

At mm-wave frequencies, the dispersion characteristic (which is often quantified by the variation in propagation velocity as a function of frequency) tends to be dominated by waveguide dispersion—Dispersion due to the waveguide geometry, e.g., the percentage of energy travelling in air vs. the percentage of energy travelling in plastic. Other mechanisms, e.g., polarization dispersion, multi-mode dispersion and material dispersion, have a considerably weaker effect.

The above-described dispersion characteristics are unique to waveguides (e.g., plastic waveguides) at mm-wave frequencies, as opposed, for example, to dispersion exhibited by optical fibers at optical wavelengths. Solutions that enable broadband optical communication over optical fibers are therefore generally unsuitable for mm-wave communication over plastic waveguides.

Embodiments that are described herein provide improved methods and apparatus for broadband communication at mm-wave frequencies over plastic waveguides. In the context of the present disclosure and in the claims, the term "millimeter-wave signal" refers to a signal whose wavelength is roughly in the range of 1 mm-10 mm, although the disclosed techniques are suitable for use at higher or lower frequencies, as well.

In some disclosed embodiments, a communication system comprises a transmitter that transmits mm-wave signals to a receiver over a plastic waveguide. The waveguide has a given dispersion characteristic over a predefined band of mm-wave frequencies. The system compensates for at least part of the dispersion characteristic of the waveguide, over the predefined band, using a Composite Right/Left-Handed (CRLH) metamaterial assembly.

In various embodiments, the CRLH metamaterial assembly may be integrated in the transmitter, in the receiver, or in an in-line repeater inserted between sections of the waveguide, for example. In the present context, a transmitter, a receiver and a repeater are regarded as examples of a communication device that communicates with another communication device over a waveguide. The CRLH metamaterial assembly may be integrated in any such communication device.

In various embodiments, the CRLH metamaterial assembly may operate at Radio Frequency (RF), i.e., at the actual mm-wave frequency band, or at some lower Intermediate Frequency (IF). Some implementations lend themselves to on-chip integration of the CRLH metamaterial assembly with other RF elements, e.g., in a Complementary Metal-Oxide Semiconductor (CMOS) RF chip, or with other baseband elements in a CMOS baseband chip. Other implementations lend themselves to package-level integration of the CRLH in a multi-chip transmitter, receiver or repeater.

In some embodiments, the CRLH metamaterial assembly comprises a transmission line (TL) formed of a cascade of multiple unit cells. Each unit cell comprises (i) a series capacitance and a series inductance, and (ii) a shunt capacitance connected in parallel to a shunt inductance. Such a transmission line may be fabricated, for example, in a CMOS process or using microstrip transmission lines.

The number of unit cells, and the values of the capacitances and inductances of the unit cell, are designed so that the CRLH metamaterial assembly has a dispersion characteristic that reverses the dispersion characteristic of the waveguide over the predefined band. Typically, the dispersion characteristic of the waveguide exhibits a group-delay that increases with frequency over the band, and the CRLH metamaterial assembly is thus designed to exhibit a group-delay that decreases with frequency over the band.

Some disclosed embodiments provide CRLH metamaterial assemblies having adjustable dispersion characteristics. Methods for calibrating an adjustable CRLH metamaterial assembly to match a specific waveguide, and an associated receiver architecture, are also described.

Computerized electromagnetic simulations indicate that the disclosed techniques are capable of practically flattening the dispersion characteristic of a plastic waveguide. In the above example of a 15-meter long Teflon® waveguide, a CRLH metamaterial assembly of eleven unit cells is able to reduce the delay-spread from approximately 0.7 nSec to approximately 0.03 nS=30 pS over the band 90-94 GHz. This residual dispersion is sufficiently small to enable reliable communication at data rates on the order of several Mbps.

FIG. 1 is a block diagram that schematically illustrates a communication system 20, in accordance with an embodiment that is described herein. In an example embodiment, system 20 is used in an automotive communication network, for in-car networking in a motor vehicle. In another embodiment, system 20 is used for data communication in an industrial plant. Alternatively, the disclosed techniques are applicable in any other suitable application or environment.

In the present example, system 20 comprises a transmitter 24 and a receiver 28 that communicate over a plastic waveguide 32. Transmitter 24 generates a mm-wave signal that carries data, and transmits the signal into one end of waveguide 32 using a coupler 36. At the other end of waveguide 32, receiver 28 receives the mm-wave signal using a coupler 40, and demodulates the received signal so as to extract the data carried on the mm-wave signal.

In various embodiments, waveguide 32 may comprise any suitable material, e.g. a suitable plastic. Non-limiting example materials comprise fluoropolymers such as Polytetrafluoroethylene (PTFE) or polyethylene (PE). Any suitable waveguide configuration (e.g., geometry, structure and material composition) can be used. Non-limiting example implementations of transmitter 24 and receiver 28 are depicted in FIGS. 3-11 and 16 below.

In an example embodiment, the data rate that transmitter 24 and receiver 28 are required to transfer is at least 1 Gbps, e.g., 4 Gbps, and the available bandwidth is on the order of several GHz in the 90 GHz band. Waveguide 32 in this example, however, is highly dispersive at mm-wave frequencies. In an example embodiment, waveguide 32 is fifteen meters long, and the delay-spread of waveguide 32 is on the order of 0.7 nSec.

In an embodiment, in order to enable communication at the required data rate over such a highly dispersive waveguide, system 20 comprises a Composite Right/Left-handed (CRLH) metamaterial assembly 44 that compensates for at least part of the dispersion of waveguide 32. In the description that follows, for the sake of brevity, the CRLH metamaterial assemblies described herein are referred to simply as "CRLH", "CRLH TL" or "CRLH assembly".

Figure 12:
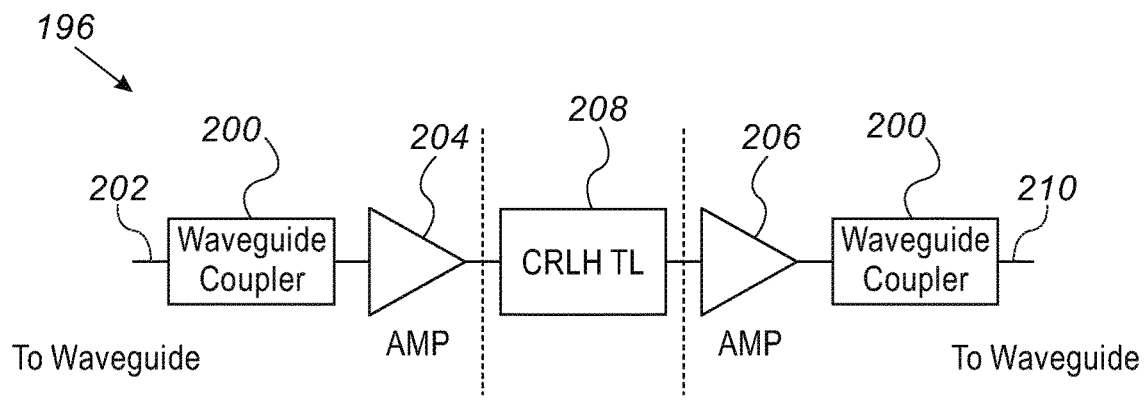
FIGS. 12 and 13 are block diagrams that schematically illustrate in-line repeaters for millimeter-wave plastic waveguides, including CRLH metamaterial assemblies, in accordance with embodiments that are described herein.
Figure 13:
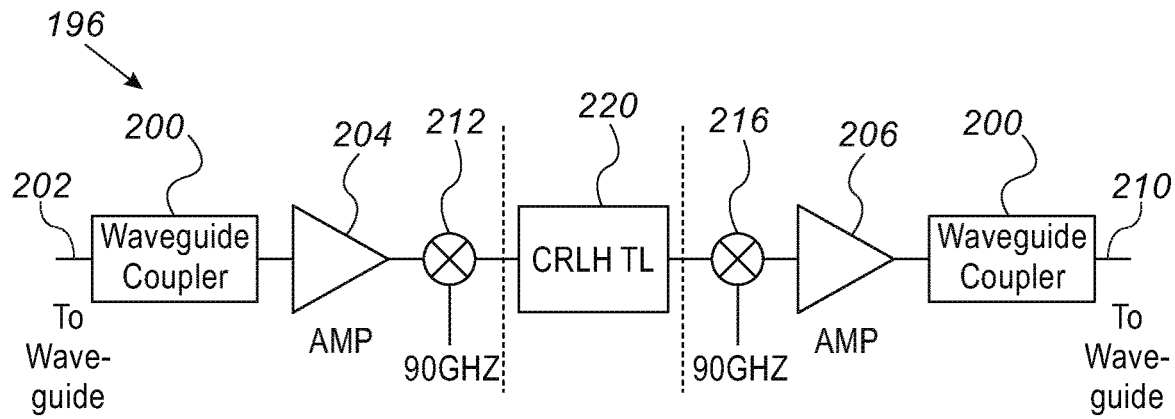

In the present example, although not necessarily, CRLH 44 is integrated in transmitter 24. Example implementations of transmitters comprising CRLH assemblies are depicted in FIGS. 3-8 below. In some alternative embodiments, but not necessarily, CRLH 44 is integrated in receiver 28. Example implementations of receivers comprising CRLH assemblies are depicted in FIGS. 9-11 and 16 below. In yet other embodiments, CRLH 44 is integrated in an in-line repeater that is inserted between adjacent sections of waveguide 32. Example implementations of repeaters comprising CRLH assemblies are depicted in FIGS. 12 and 13 below.

In still other embodiments, system 20 may comprise multiple CRLH assemblies, each of which is integrated in the transmitter, in the receiver or in a repeater. In some of these embodiments, two or more CRLH assemblies compensate for dispersion jointly in the same frequency band, with each CRLH compensating for part of the waveguide dispersion over the band in question. In other embodiments, two or more CRLH assemblies compensate for dispersion in different frequency bands.

Figure 3:
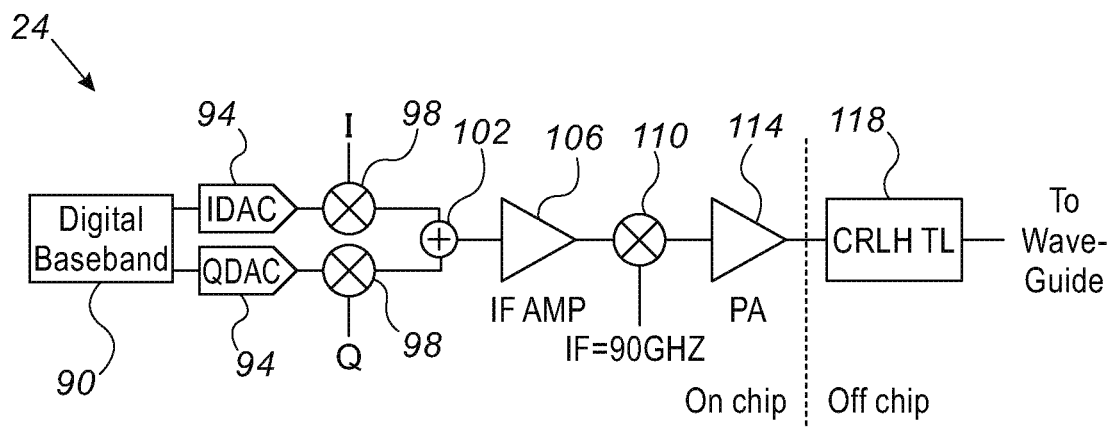
FIG. 3 is a block diagram that schematically illustrates the millimeter-wave transmitter of FIG. 1 including a CRLH metamaterial assembly, in accordance with an embodiment that is described herein.

An inset at the bottom of FIG. 1 illustrates the electrical structure of CRLH assembly 44, in an embodiment. CRLH 44 is implemented as a transmission line comprising multiple unit cells 48 connected in cascade. The dispersion characteristic of this CRLH assembly, and the way it is used for compensating for the dispersion characteristic of waveguide 32, are shown in FIG. 3 below.

In the present example, each unit cell 48 comprises a series block 52 and a parallel block 56 (also referred to as a shunt block). Each series block 52 comprises a series capacitor 60 and a series inductor 64. Each parallel block 56 comprises a parallel (shunt) capacitor 68 and a parallel (shunt) inductor 72. When connected in cascade, unit cells 48 jointly form a transmission line having composite LH and RH properties. In particular, by proper choice of the number of unit cells 48 and the values of the capacitances and inductances in the unit cells, it is possible to design CRLH 44 to have a group-delay characteristic that decreases as a function of frequency with a desired slope over a desired frequency band.

In various embodiments, CRLH 44 may be fabricated using various types of capacitors and inductors and using various manufacturing processes. In one embodiment, CRLH 44 is disposed on a suitable substrate in a CMOS process. In one embodiment of this sort, inductors 64 and 72 comprise on-chip spiral inductors, and capacitors 60 and 68 comprise on-chip fringe capacitors. When using CMOS implementations, CRLH 44 may be disposed on-chip together with other elements of the transmitter, receiver or repeater, as appropriate. Example transmitter and receiver configurations with on-chip CRLH are depicted in FIGS. 5, 6, 10, 11 and 16 below. In some of these embodiments the CRLH is integrated with other RF elements in an RF CMOS chip. In some of these embodiments the CRLH is integrated with other baseband elements in a baseband CMOS chip.

In another embodiment, CRLH 44 is manufactured as a microstrip transmission line on a suitable substrate, e.g., by disposing microstrip conductors on a Printed Circuit Board (PCB) substrate in a PCB manufacturing process or multi-layer ceramic/organic substrate in an integrated circuit packaging process. In one embodiment of this sort, inductors 64 and 72 comprise shorted-stub inductors, and capacitors 60 and 68 comprise interdigital capacitors. When using a microstrip implementation, CRLH 44 is typically implemented off-chip as a separate device. Example transmitter, receiver and repeater implementations, in which an off-chip CRLH is integrated with the other transmitter elements in a single package, are depicted in FIGS. 3, 4, 7-9, 12 and 13 below.

Alternatively, CRLH 44 may comprise any other suitable types of capacitors and inductors, and may be fabricated, on-chip or as a separate device, using any other suitable process.

Figure 2:
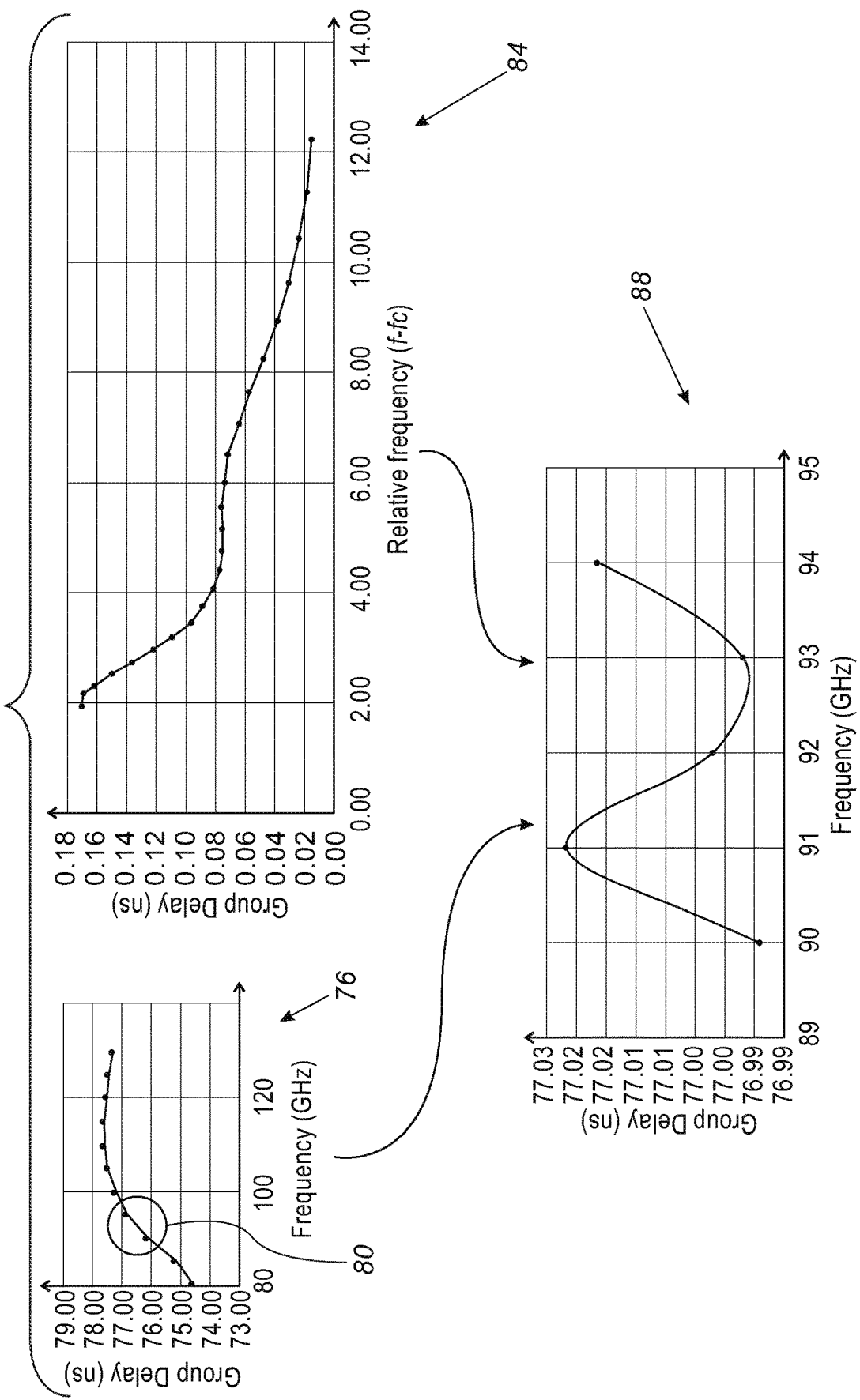
FIG. 2 is a diagram illustrating group-delay as a function of frequency for (i) the plastic waveguide of FIG. 1 (ii) the CRLH metamaterial assembly of FIG. 1, and (iii) a cascade of the plastic waveguide and the CRLH metamaterial assembly, in accordance with an embodiment that is described herein.

FIG. 2 is a diagram illustrating group-delay as a function of frequency for (i) a plastic waveguide (ii) a CRLH metamaterial assembly, and (iii) a cascade of a plastic waveguide and a CRLH metamaterial assembly, in accordance with an embodiment that is described herein.

A graph 76 shows the group-delay characteristic of a 15-meter long single-mode plastic waveguide. In this example, dispersion compensation is sought over a pre-defined band 80 of mm-wave frequencies, between 90-94 GHz. As seen in the figure, the group-delay of the waveguide increases monotonically as a function of frequency over band 80, and has a delay-spread of approximately 0.7 nS.

A graph 84 shows the group-delay characteristic of a single unit cell 48 of CRLH 44, in an embodiment. Note that the horizontal axis of graph 84 (in units of relative frequency, i.e., offset in GHz from the CRLH center frequency) is different from the horizontal axis of graph 76 (in units of absolute frequency in GHz). As seen in the figure, the group-delay of a unit cell 48 decreases monotonically as a function of frequency, and has a delay-spread of approximately 0.15 nS. In order to compensate for larger delay-spreads, multiple unit cells 48 are cascaded as shown in FIG. 1 above.

A graph 88 shows the group-delay characteristic of a cascade of (i) the waveguide characterized in graph 76 and (ii) a CRLH formed of eleven unit cells 48 characterized in graph 84. The figure shows clearly that the group-delay of the waveguide is almost entirely canceled. The residual group-delay over band 80 (90-94 GHz) is only approximately 0.03 nS=30 pS.

FIG. 3 is a block diagram that schematically illustrates an example implementation of millimeter-wave transmitter 24, in accordance with an embodiment that is described herein. In the present embodiment, transmitter 24 comprises an integrated baseband (BB) and Radio Frequency (RF) chip. A dashed line on the right-hand side of the figure shows the chip boundary, i.e., the boundary between on-chip elements and off-chip elements. In the present context, the term "chip" refers to a device, whether packaged or unpackaged, having a single semiconductor die. Thus, the term "on-chip" means "on the same die."

The transmitter of FIG. 3 comprises digital baseband circuitry 90 that is configured to generate a digital baseband signal having. In-phase (I) and Quadrature (Q) components. A pair of Digital-to-Analog Converters (DACs) 94, denoted IDAC and QDAC, convert the I and Q components of the digital baseband signal into analog baseband I and Q signals. A pair of Intermediate Frequency (IF) mixers 98 up-convert the analog baseband I and Q signals to a suitable IF, by mixing the analog baseband I and Q signals with suitable signals of a Local Oscillator (LO—not seen). In one example, the IF is 12 GHz, although any other suitable IF can be used. A combiner 102 combines the outputs of mixers 94, to produce a real IF signal. An IF amplifier 106 amplifies the IF signal.

An RF mixer 110 up-converts the IF signal to RF, by mixing the IF signal with a suitable LO signal. In one example, the RF is in the 90 GHz band, although any other suitable RF can be used. A Power Amplifier (PA) 114 amplifies the RF (mm-wave) signal. The output of PA 114 is provided as the output of the integrated BB&RF chip.

In this embodiment, transmitter 24 comprises a CRLH 118 that operates at the final RF of 90 GHz. The output of CRLH 118 is provided to waveguide 32. CRLH 118 is configured to apply to the RF signal passing therethrough a dispersion compensation that compensates for at least part of the dispersion characteristic of waveguide 32.

In various embodiments, the mm-wave signal is provided to the input of CRLH 118, and conveyed from CRLH 118 to waveguide 32, in various ways. In some embodiments (e.g., in FIG. 4 below) the BB&RF, the CRLH and the waveguide coupler are mounted on the same substrate, and interconnected by suitable transmission lines. In other embodiments the CRLH is a standalone packaged device that is connected to the other transmitter elements using suitable interconnections.

Figure 4:
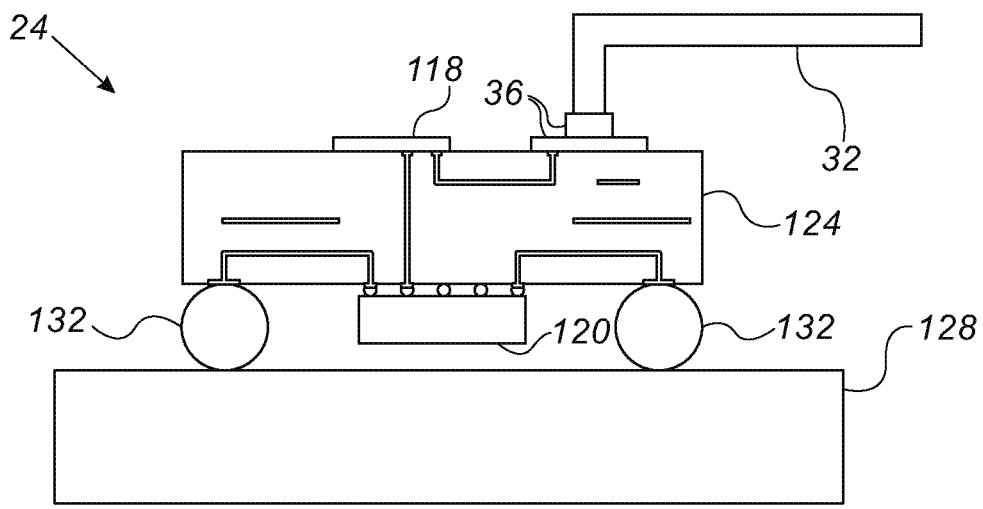
FIG. 4 is a schematic mechanical side view of the millimeter-wave transmitter of FIG. 3, in accordance with an embodiment that is described herein.

FIG. 4 is a schematic side view of a possible physical implementation of millimeter-wave transmitter of FIG. 3, in accordance with an embodiment that is described herein. In the embodiment of FIG. 4, transmitter 24 is implemented using multiple chips that are mounted on a common organic substrate 124, e.g., a silicon substrate, and packaged in a single package.

In this example, transmitter 24 comprises an integrated CMOS BB&RF chip 120, which comprises the on-chip elements shown in FIG. 3 above. BB&RF chip 120 and CRLH 118 are mounted on opposite surfaces of substrate 124. Waveguide coupler 36 is also mounted on substrate 124, and is connected to plastic waveguide 32. Transmitter 24 further comprises interconnection terminals 132, e.g., leads or balls, for soldering to a PCB 128 of a host system. Signals between chip 120, CRLH 118, coupler 36 and terminals 132 are transferred over suitable conductive layers and plated holes ("vias") in substrate 124.

Figure 5:
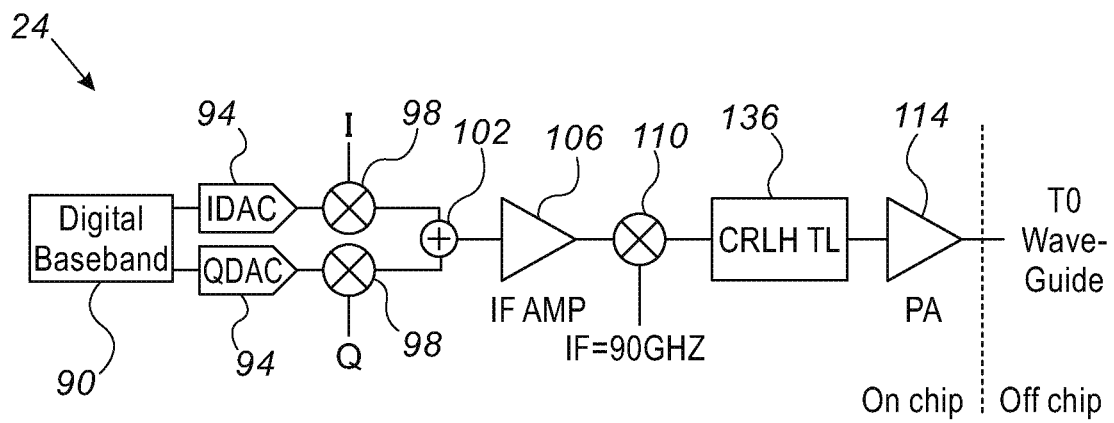
FIGS. 5-7 are block diagrams that schematically illustrate millimeter-wave transmitters including CRLH metamaterial assemblies, in accordance with alternative embodiments that are described herein.

FIG. 5 is a block diagram that schematically illustrates another possible implementation of millimeter-wave transmitter 24, in accordance with an embodiment that is described herein. In this embodiment, the CRLH operates at RF, e.g., 90 GHz, and is integrated with the other elements of the transmitter in a CMOS BB&RF chip, prior to power amplification. As seen in the figure, the transmitter of FIG. 5 comprises an on-chip CRLH 136 that is located between RF mixer 110 and PA 114.

Figure 6:
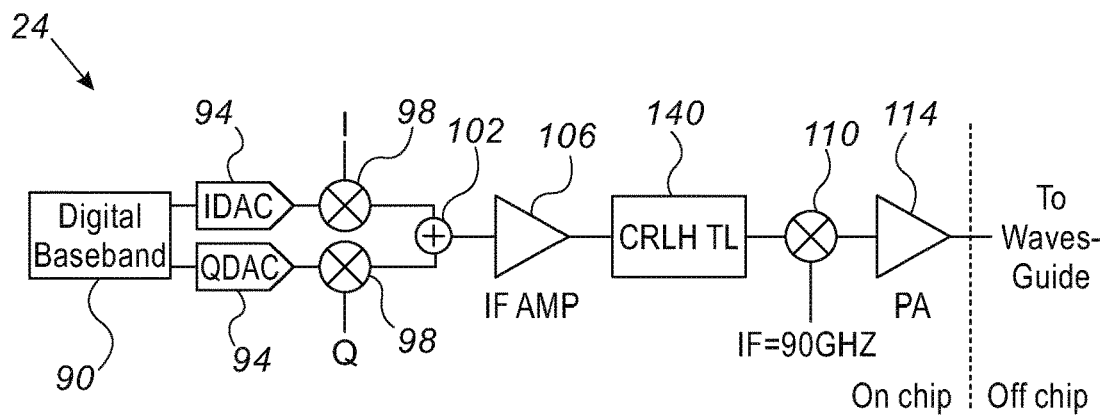

FIG. 6 is a block diagram that schematically illustrates another possible implementation of millimeter-wave transmitter 24, in accordance with an embodiment that is described herein. In this embodiment, the CRLH is again integrated with the other elements of the transmitter in a CMOS BB&RF chip. In the present example, however, the CRLH operates at IF, e.g., 12 GHz. As seen in the figure, the transmitter of FIG. 6 comprises an on-chip CRLH 140 that is located between IF amplifier 106 and RF mixer 110.

Figure 7:
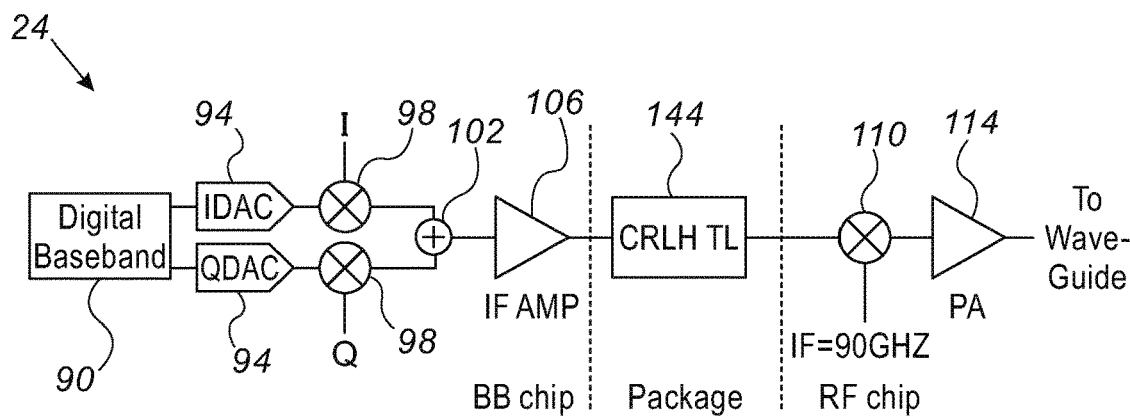

FIG. 7 is a block diagram that schematically illustrates yet another possible implementation of millimeter-wave transmitter 24, in accordance with an embodiment that is described herein. In this embodiment, BB processing and RF processing are performed by separate chips. The CRLH operates at IF (e.g., 12 GHz), off-chip but typically in the same package as the BB and RF chips.

In FIG. 7, two dashed lines mark the boundaries between elements comprised in the BB chip, elements comprised in the RF chip, and off-chip elements. As seen, the transmitter comprises a CRLH 144 that operates at IF, and is located between IF amplifier 106 (in the BB chip) and RF mixer 110 (in the RF chip).

Figure 8:
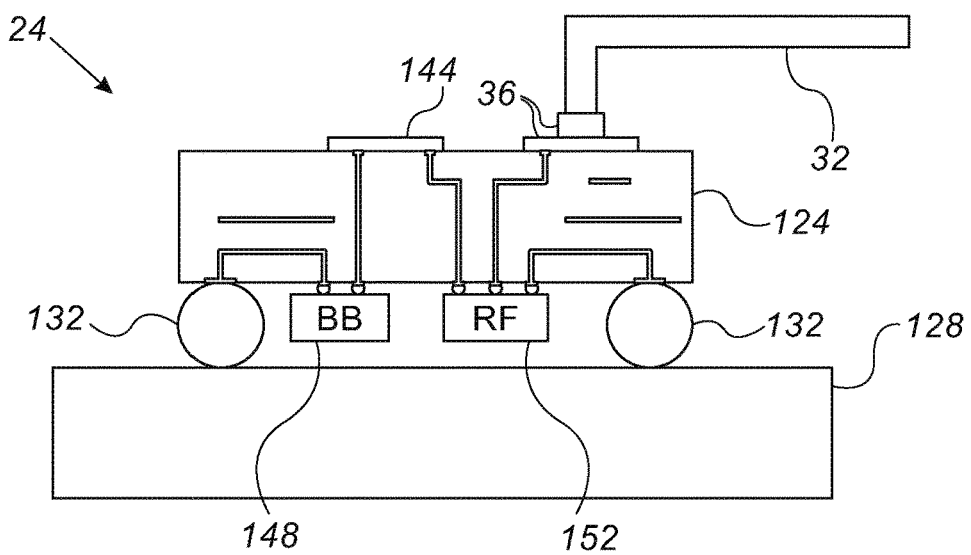
FIG. 8 is a schematic mechanical side view of the millimeter-wave transmitter of FIG. 7, in accordance with an embodiment that is described herein.

FIG. 8 is a schematic side view of a possible physical implementation of millimeter-wave transmitter of FIG. 7, in accordance with an embodiment that is described herein. In the embodiment of FIG. 8, transmitter 24 is implemented using multiple chips that are mounted on common organic substrate 124 and packaged in a single package.

In this example, transmitter 24 comprises a BB chip 148 and an RF chip 152. The components comprised in each of chips 148 and 152 are shown in FIG. 7 above. BB chip 148 and RF chip 152 are mounted on one surface of substrate 124. CRLH 144 and waveguide coupler 36 are mounted on the opposite surface.

The transmitter configurations shown in FIGS. 3-8 are example configurations that are depicted solely for the sake of conceptual clarity. Any other suitable transmitter configurations can be used in alternative embodiments. In the schemes of FIGS. 3-8 the CRLH is located on the transmitter side. Such transmitter-side dispersion compensation is sometimes referred to as "pre-distortion" since it pre-compensates for distortion that is created by a waveguide located downstream.

Figure 9:
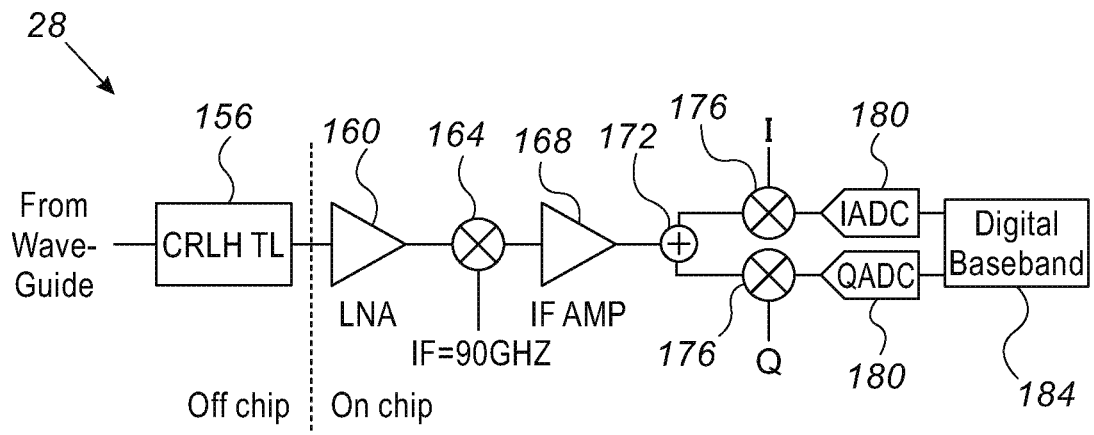
FIGS. 9-11 are block diagrams that schematically illustrate millimeter-wave receivers including CRLH metamaterial assemblies, in accordance with embodiments that are described herein.

FIG. 9 is a block diagram that schematically illustrates an example implementation of millimeter-wave receiver 28, in accordance with an embodiment that is described herein. In the present example, the RF and BB processing of the receiver may be performed by an integrated RF&BB chip or separately by an RF chip and a BB chip. The CRLH is off-chip, but typically in the same package as the RF and BB chip or chips. The CRLH operates at RF (e.g., 90 GHz) and is located prior to low-noise amplification. A dashed line in the figure marks the boundary between on-chip and off-chip elements.

In the embodiment of FIG. 9, the receiver comprises a CRLH 156 that receives the RF (mm-wave) signal from waveguide 32 and compensates for at least part of the dispersion characteristic of the waveguide. The output of CRLH 156 is amplified by a Low-Noise Amplifier (LNA) 160. An RF mixer 164 down-converts the RF signal to IF, by mixing with a suitable LO. An IF amplifier 168 amplifies the IF signal.

A quadrature (90 degree) splitter 172 splits the IF signal into I and Q components. A pair of IF mixers 176 down-convert the I and Q components to baseband, by mixing with suitable signals of a LO (not seen). A pair of Analog-to-Digital Converters (ADCs) 180, denoted IADC and QADC, digitize the baseband I and Q signals. Digital baseband circuitry 184 processes the digitized baseband I and Q signals so as to extract the data carried by the signal.

Figure 10:
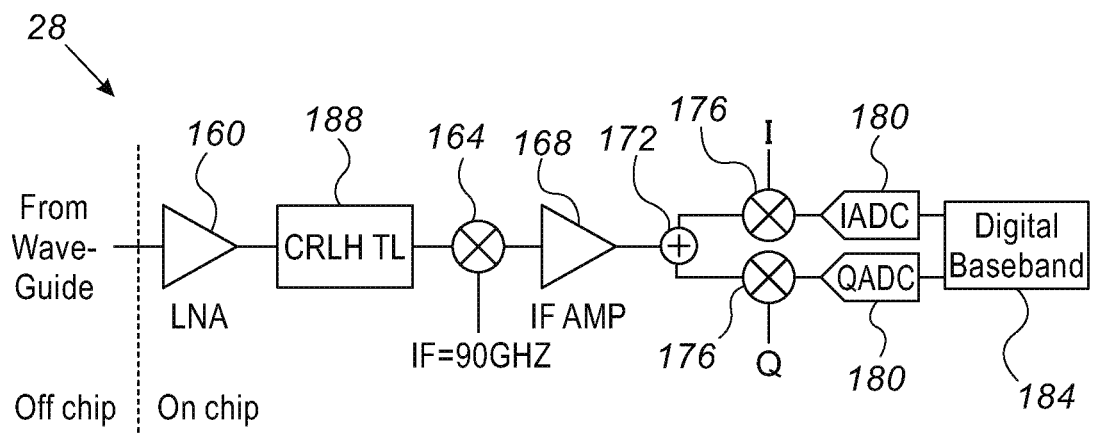

FIG. 10 is a block diagram that schematically illustrates another example implementation of millimeter-wave receiver 28, in accordance with an embodiment that is described herein. In the present example, the CRLH is on-chip, e.g., in a CMOS RF chip or in an integrated RF&BB chip. The CRLH operates at RF (e.g., 90 GHz) and is located after low-noise amplification and before down-conversion. In the embodiment of FIG. 10, the receiver comprises a CRLH 188 that is located after LNA 160 and before RF mixer 164.

Figure 11:
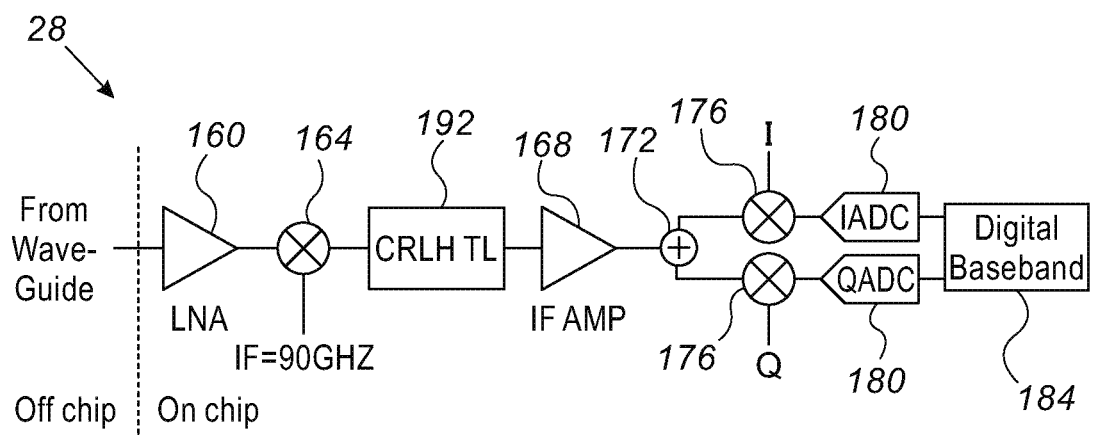

FIG. 11 is a block diagram that schematically illustrates yet another example implementation of millimeter-wave receiver 28, in accordance with an embodiment that is described herein. In this example, the CRLH is on-chip, e.g., in a CMOS BB chip. The CRLH operates at IF (e.g., 12 GHz) and is located after down-conversion to IF and before IF amplification. In the embodiment of FIG. 11, the receiver comprises a CRLH 192 that is located after RF mixer 164 and before IF amplifier 168.

The receiver configurations shown in FIGS. 9-11 are example configurations that are depicted solely for the sake of conceptual clarity. Any other suitable receiver configurations can be used in alternative embodiments. In the schemes of FIGS. 9-11 the CRLH is located on the receiver side. Receiver-side dispersion compensation is sometimes referred to as "post-distortion" since it compensates for distortion that was previously created by a waveguide located upstream.

In some embodiments, waveguide 32 (FIG. 1) comprises two or more waveguide sections, and an in-line repeater is inserted between adjacent waveguide sections. The repeater amplifies the signal passing through it, at RF or at IF, to overcome losses in the waveguide. In some embodiments the repeater further comprises a CRLH assembly that performs dispersion compensation. The CRLH in the repeater may compensate, for example, for dispersion that is introduced by a preceding waveguide section (post-distortion), for dispersion that is introduced by a subsequent waveguide section (pre-distortion), or both.

FIG. 12 is a block diagram that schematically illustrates an example implementation of an in-line repeater 196 for a millimeter-wave plastic waveguide, in accordance with an embodiment that are described herein. Repeater 196 operates entirely at RF (e.g., 90 GHz) and does not perform any frequency conversion. Repeater 196 comprises a CRLH 208 that operates at RF, as well.

In the present embodiment, repeater 196 comprises a waveguide coupler 200 for receiving the RF (mm-wave) signal from the preceding section of waveguide 32 on an input 202, an input amplifier 204 (e.g., a LNA) for amplifying the received RF signal, an output amplifier 206 (e.g., a PA) for amplifying the RF signal before transmission, and another waveguide coupler 200 for transmitting the amplified RF signal into the next section of waveguide 32 on an output 210. CRLH 208 is located after input amplifier 204 and before output amplifier 206. In various embodiments, CRLH 208 may be on-chip or off-chip.

FIG. 13 is a block diagram that schematically illustrates another example implementation of in-line repeater 196, in accordance with an alternative embodiment that are described herein. In the example of FIG. 13, repeater 196 comprises a CRLH 220 that operates at IF, e.g., at 12 GHz. In the present embodiment, repeater 196 further comprises an RF mixer 212 for down-converting the received RF signal to IF by mixing with a suitable signal of a LO, and another RF mixer for up-converting the IF signal back to RF by mixing with the LO signal. CRLH 220 is located between the two mixers. In the embodiment seen, CRLH 220 is off-chip, e.g., in the same package as the other elements.

The in-line repeater configurations shown in FIGS. 12 and 13 are example configurations that are depicted solely for the sake of conceptual clarity. Any other suitable repeater configurations can be used in alternative embodiments. For example, some amplification may also be performed at IF.

In some embodiments that are described herein, the CRLH assembly is externally configurable, i.e., adjustable, meaning the dispersion characteristic of the CRLH assembly can be controlled and tuned. Such an externally configurable CRLH can typically be set to one of multiple predefined settings, each setting having a respective different dispersion compensation characteristic.

In some embodiments, a receiver in system 20 adjusts the dispersion characteristic of the CRLH assembly to best compensate for the dispersion characteristic of the plastic waveguide. This sort of calibration can be performed at any suitable time, e.g., on power-up, periodically or in response to some event.

Figure 14:
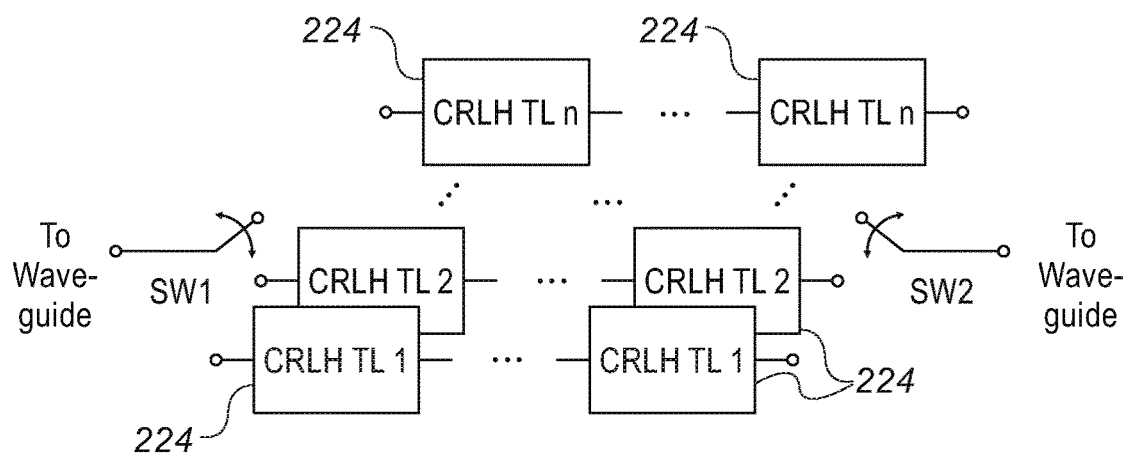
FIGS. 14 and 15 are block diagrams that schematically illustrate CRLH metamaterial assemblies with adjustable dispersion characteristics, in accordance with embodiments that are described herein.

FIG. 14 is a block diagram that schematically illustrates an adjustable (externally configurable) CRLH metamaterial assembly, in accordance with an embodiment that is described herein. The adjustable CRLH of FIG. 14 comprises multiple cascades of CRLH unit cells 224. The cascades are numbered 1 . . . n. The n cascades differ from one another in their dispersion characteristic. In one example embodiment, different cascades have different numbers of unit cells 224. In another embodiment, the dispersion characteristic of the individual unit cell differs from one cascade to another. Hybrid schemes, in which one cascade differs from another both in the number of unit cells and in the dispersion characteristic of the individual unit cell, are also feasible.

Figure 16:
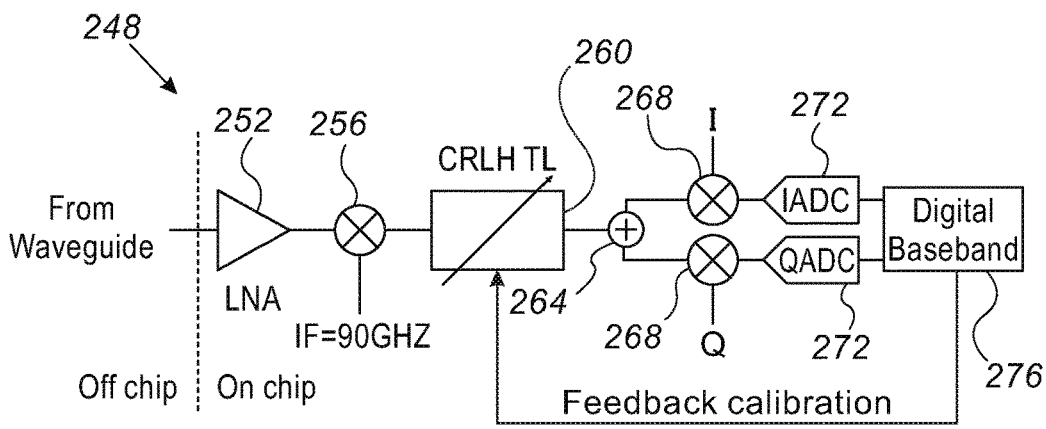
FIG. 16 is a block diagram that schematically illustrates a millimeter-wave receiver having an adjustable CRLH metamaterial assembly, in accordance with an embodiment that is described herein.

The adjustable CRLH further comprises an input switch denoted SW1 and an output switch denoted SW2. The two switches are controlled, for example, by the baseband circuitry of a receiver. An example receiver of this sort is depicted in FIG. 16 below. By controlling switches SW1 and SW2, the receiver is able to adjust the dispersion characteristic of the CRLH assembly.

Figure 15:
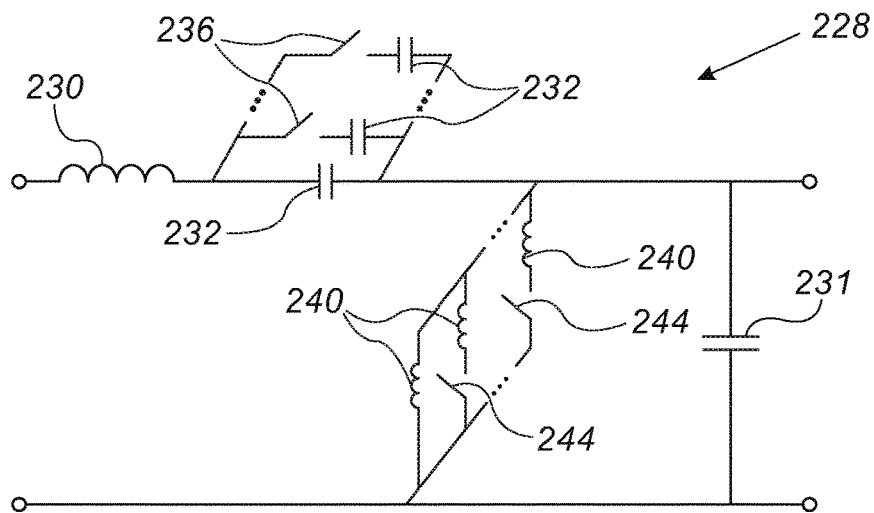

FIG. 15 is a block diagram that schematically illustrates an adjustable (externally configurable) CRLH metamaterial assembly 228, in accordance with an alternative embodiment that is described herein. In the present example, the adjustable CRLH comprises a series inductor 230 and a parallel (shunt) capacitor 231. The CRLH further comprises a bank of selectable series capacitors 232, and a bank of selectable parallel (shunt) inductors 240. Capacitors 232 are selectable by switches 236—Each switch 236 selectively switches a respective capacitor 232 into or out of the circuit. Inductors 240 are selectable by switches 244—Each switch 244 selectively switches a respective inductor 240 into or out of the circuit.

Switches 236 and switches 244 are controlled, for example, by the baseband circuitry of a receiver, e.g., the receiver of FIG. 16 below. By controlling switches 236, the receiver is able to adjust the total series capacitance of CRLH 228. By controlling switches 244, the receiver is able to adjust the total shunt inductance of CRLH 228. These adjustments modify the dispersion characteristic of the CRLH. As noted above, a receiver baseband circuitry may modify the dispersion characteristic of the CRLH at any suitable time, e.g., on power-up, periodically or in response to an event.

The adjustable CRLH configurations shown in FIGS. 14 and 15 are example configurations that are depicted solely for the sake of conceptual clarity. Any other suitable adjustable CRLH configurations can be used in alternative embodiments.

FIG. 16 is a block diagram that schematically illustrates a millimeter-wave receiver 248 having an adjustable CRLH metamaterial assembly 260, in accordance with an embodiment that is described herein. CRLH 260 may comprise, for example, the CRLH of FIG. 14, the CRLH of FIG. 15, or any other suitable CRLH having an adjustable dispersion characteristic.

In the embodiment of FIG. 16, the receiver comprises a Low-Noise Amplifier (LNA) 252 that receives the RF (mm-wave) signal from waveguide 32 and amplifies the received RF signal. An RF mixer 256 down-converts the RF signal to IF, by mixing with a suitable LO. Adjustable CRLH 260, which operates at IF, compensates for at least part of the dispersion characteristic of waveguide 32.

The output of CRLH 260 is provided to a quadrature splitter 264, which splits the IF signal into I and Q components. A pair of IF mixers 268 down-convert the I and Q components to baseband, by mixing with suitable LO signals. A pair of ADCs 272, denoted IADC and QADC, digitize the baseband I and Q signals. Digital baseband circuitry 276 processes the digitized baseband I and Q signals.

Among other tasks, baseband circuitry 276 measures the quality of the received signal (the baseband I and Q signals) and, based on the measured signal quality, adjusts the dispersion characteristic of CRLH 260. The assumption is that the best signal quality is achieved when the CRLH best compensates for the dispersion characteristic of waveguide 32.

The receiver configuration shown in FIG. 16 is an example configuration that is depicted solely for the sake of conceptual clarity. Any other suitable receiver configuration, e.g., a receiver in which the adjustable CRLH operates at RF, or a receiver in which the adjustable CRLH is off-chip, can be used in alternative embodiments.

Figure 17:
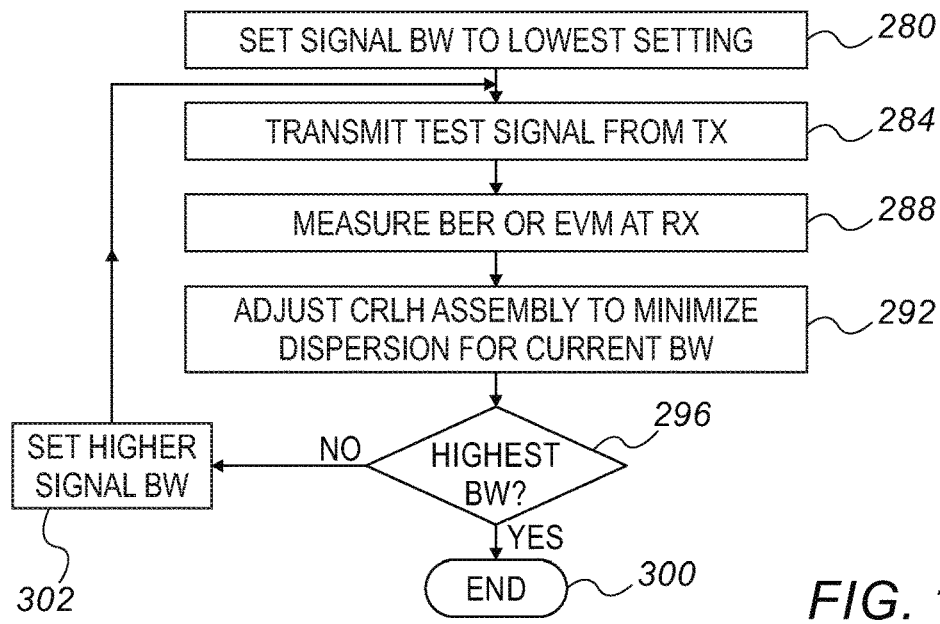
FIG. 17 is a flow chart that schematically illustrates a method for calibrating the dispersion characteristic of a CRLH metamaterial assembly, in accordance with an embodiment that is described herein.

FIG. 17 is a flow chart that schematically illustrates a method for calibrating the dispersion characteristic of CRLH metamaterial assembly 260 in receiver 248 of FIG. 16, in accordance with an embodiment that is described herein. In this example, receiver 248 and its peer transmitter are configured to select the signal bandwidth for communicating with one another, from a set of predefined bandwidths. Since waveguide 32 typically exhibits different dispersion characteristics over different signal bandwidths, calibration of CRLH 260 is performed per bandwidth. Typically, the optimal setting of CRLH 260 for each bandwidth is stored in receiver 248. When later communicating at a certain bandwidth, baseband circuitry 276 of receiver 248 sets CRLH 260 to the optimal setting found for that bandwidth.

The method of FIG. 17 begins with baseband circuitry 276 of receiver 248 setting the reception bandwidth to the lowest bandwidth setting supported, at an initialization operation 280. Baseband circuitry 276 indicates the current bandwidth setting to the peer transmitter that communicates with receiver 248.

At a test transmission operation 284, the peer transmitter transmits a test signal having the current bandwidth setting. At a quality measurement, baseband circuitry 276 measures the quality of the received test signal. In one embodiment, baseband circuitry 276 evaluates the Bit Error Rate (BER) of the received test signal. In another embodiment, baseband circuitry 276 evaluates the Error Vector Magnitude (EVM) of the received test signal. Alternatively, any other suitable quality measure can be used.

At a calibration operation 292, baseband circuitry 276 adjusts the dispersion characteristic of CRLH 260 to the setting that provides best signal quality. This setting minimizes the residual dispersion, i.e., best compensates for the dispersion of waveguide 32 (over the current bandwidth of the test signal).

At a checking operation 296, baseband circuitry 276 checks whether the current bandwidth setting is the highest bandwidth setting. If so, the method ends at a termination operation 300. Otherwise, baseband circuitry 276 proceeds to set the next-higher bandwidth setting, and updates the peer transmitter, at a bandwidth incrementing operation 302. The method then loops back to test transmission operation 284.

The various elements of the various transmitters, receivers, repeaters and CRLH assemblies described herein may be implemented using dedicated hardware or firmware, such as using discrete components, using one or more RF Integrated Circuits (RFICs), Application-Specific Integrated Circuits (ASICs) or Field-Programmable Gate Arrays (FPGAs), using software, or using a combination of hardware and software elements.

In some embodiments, some transmitter or receiver functions, e.g., certain baseband processing tasks, are performed by a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments are described in the context of automotive networks, the methods and systems described herein can also be used in other applications, such as in transmission of network data in other environments, e.g., in industrial networks or smart home environments.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A millimeter-wave communication device, comprising:
   a coupler, configured to connect to a waveguide, the waveguide being transmissive at millimeter-wave frequencies and having a given dispersion characteristic over a predefined band of the millimeter-wave frequencies;
   Radio-Frequency (RF) circuitry that is configured to transmit a millimeter-wave signal into the waveguide via the coupler, or to receive a millimeter-wave signal from the waveguide via the coupler, and to process the millimeter-wave signal; and
   a composite right/left-handed metamaterial assembly, which is formed to apply to the millimeter-wave signal, or to an Intermediate-Frequency (IF) signal corresponding to the millimeter-wave signal, a dispersion compensation that compensates for at least part of the dispersion characteristic of the waveguide over the predefined band,
   wherein the composite right/left-handed metamaterial assembly comprises (i) multiple capacitors, (ii) multiple inductors, and (iii) two or more switches configured to select a setting of the dispersion compensation from among multiple predefined settings of the dispersion compensation, by selectably connecting and disconnecting selected ones of the capacitors and the inductors.

2. The millimeter-wave communication device according to claim 1, wherein the composite right/left-handed metamaterial assembly comprises a cascade of multiple transmission-line unit cells, each unit cell comprising (i) a series capacitance and a series inductance, and (ii) a shunt capacitance in parallel to a shunt inductance.

3. The millimeter-wave communication device according to claim 1, wherein the dispersion characteristic of the waveguide exhibits a group-delay that increases with frequency over the predefined band of the millimeter-wave signal, and wherein the composite right/left-handed metamaterial assembly exhibits a group-delay that decreases with frequency over the predefined band.

4. The millimeter-wave communication device according to claim 1, wherein the RF circuitry is configured to transmit the millimeter-wave signal into the waveguide, and wherein the composite right/left-handed metamaterial assembly is configured to compensate for the at least part of the dispersion characteristic by pre-distorting the millimeter-wave signal prior to transmission into the waveguide.

5. The millimeter-wave communication device according to claim 1, wherein the RF circuitry is configured to receive the millimeter-wave signal from the waveguide, and wherein the composite right/left-handed metamaterial assembly is configured to compensate for the at least part of the dispersion characteristic by applying the dispersion compensation to the millimeter-wave signal received from the waveguide.

6. The millimeter-wave communication device according to claim 1, wherein the RF circuitry and the composite right/left-handed metamaterial assembly are integrated in a same semiconductor chip.

7. The millimeter-wave communication device according to claim 1, further comprising digital baseband circuitry, wherein the digital baseband circuitry and the composite right/left-handed metamaterial assembly are integrated in a same semiconductor chip.

8. The millimeter-wave communication device according to claim 1, further comprising digital baseband circuitry, wherein the digital baseband circuitry, the RF circuitry and the composite right/left-handed metamaterial assembly are packaged in a same device package.

9. The millimeter-wave communication device according to claim 8, wherein the digital baseband circuitry, the RF circuitry and the composite right/left-handed metamaterial assembly are mounted on a same substrate in the same device package.

10. The millimeter-wave communication device according to claim 1, further comprising digital baseband circuitry configured to identify, from among the multiple predefined settings, a setting that best compensates for the dispersion characteristic of the waveguide, and to set the switches of the composite right/left-handed metamaterial assembly to the identified setting.

11. The millimeter-wave communication device according to claim 1, wherein the multiple capacitors and the multiple inductors are arranged in multiple cascades of transmission-line unit cells, and wherein the switches are configured to select the setting of the dispersion compensation by selecting one of the cascades.

12. The millimeter-wave communication device according to claim 1, wherein at least some of the multiple capacitors are series capacitors, wherein at least some of the inductors are shunt inductors, and wherein the switches are configured to select the setting of the dispersion compensation by selectably connecting and disconnecting selected ones of the series capacitors and the shunt inductors.

13. The millimeter-wave communication device according to claim 10, wherein the digital baseband circuitry is configured to identify the setting that best compensates for the dispersion characteristic of the waveguide, by evaluating a Bit Error Rate (BER) or an Error Vector Magnitude (EVM) of a signal transmitted via the waveguide.

14. A method for millimeter-wave communication, comprising:
   transmitting a millimeter-wave signal into, or receiving a millimeter-wave signal from, a waveguide, the waveguide being transmissive at millimeter-wave frequencies and having a given dispersion characteristic over a predefined band of the millimeter-wave frequencies; and
   using a composite right/left-handed metamaterial assembly comprising multiple capacitors and multiple inductors, applying to the millimeter-wave signal, or to an Intermediate-Frequency (IF) signal corresponding to the millimeter-wave signal, a dispersion compensation that compensates for at least part of the given dispersion characteristic of the waveguide over the predefined band, including selecting a setting of the dispersion compensation from among multiple predefined settings of the dispersion compensation, by selectably connecting and disconnecting selected ones of the capacitors and the inductors.

15. The method according to claim 14, wherein applying the dispersion compensation comprises passing the millimeter-wave signal, or the IF signal, through a cascade of multiple transmission-line unit cells, each unit cell comprising (i) a series capacitance and a series inductance, and (ii) a shunt capacitance in parallel to a shunt inductance.

16. The method according to claim 14, wherein the dispersion characteristic of the waveguide exhibits a group-delay that increases with frequency over the predefined band of the millimeter-wave signal, and wherein applying the dispersion compensation comprises applying, by the composite right/left-handed metamaterial assembly, a group-delay that decreases with frequency over the predefined band.

17. The method according to claim 14, wherein applying the dispersion compensation comprises pre-distorting the millimeter-wave signal prior to transmission into the waveguide.

18. The method according to claim 14, wherein applying the dispersion compensation comprises applying the dispersion compensation to the millimeter-wave signal received from the waveguide.

19. The method according to claim 14, wherein selecting the setting comprises identifying, from among the multiple predefined settings, a setting that best compensates for the dispersion characteristic of the waveguide, and connecting and disconnecting the selected ones of the capacitors and the inductors to set the composite right/left-handed metamaterial assembly to the identified setting.

20. A millimeter-wave communication system, comprising:
   a first communication device, configured to transmit a millimeter-wave signal into a waveguide, the waveguide being transmissive at millimeter-wave frequencies and having a given dispersion characteristic over a predefined band of the millimeter-wave frequencies; and
   a second communication device, configured to receive the millimeter-wave signal from the waveguide and to process the received millimeter-wave signal,
   wherein at least one of the first communication device and the second communication device comprises a composite right/left-handed metamaterial assembly, which is formed to apply to the millimeter-wave signal, or to an Intermediate-Frequency (IF) signal corresponding to the millimeter-wave signal, a dispersion compensation that compensates for at least part of the dispersion characteristic of the waveguide over the predefined band,
   and wherein the composite right/left-handed metamaterial assembly comprises (i) multiple capacitors, (ii) multiple inductors, and (iii) two or more switches configured to select a setting of the dispersion compensation from among multiple predefined settings of the dispersion compensation, by selectably connecting and disconnecting selected ones of the capacitors and the inductors.

* * * * *